US007095422B2

(12) United States Patent
Shouji

(10) Patent No.: US 7,095,422 B2
(45) Date of Patent: Aug. 22, 2006

(54) IMAGE PROCESSING SYSTEM, IMAGE PROCESSING APPARATUS, AND DISPLAY APPARATUS

(76) Inventor: Michihiko Shouji, 2-52-4-201 Awata, Yokosuka-shi, Kanagawa (JP) 239-0845

( * ) Notice: Subject to any disclaimer, the term of this patent is extended or adjusted under 35 U.S.C. 154(b) by 0 days.

(21) Appl. No.: 10/502,468

(22) PCT Filed: Jan. 22, 2003

(86) PCT No.: PCT/JP03/00523

§ 371 (c)(1),
(2), (4) Date: Jul. 22, 2004

(87) PCT Pub. No.: WO03/063086

PCT Pub. Date: Jul. 31, 2003

(65) Prior Publication Data

US 2005/0093887 A1    May 5, 2005

(30) Foreign Application Priority Data

Jan. 23, 2002    (JP)    ............................. 2002-013792

(51) Int. Cl.
*G09G 5/00*    (2006.01)
(52) U.S. Cl. ...................... 345/629; 345/633; 463/32
(58) Field of Classification Search ................ 700/255; 463/30–33; 345/633, 629
See application file for complete search history.

(56) References Cited

U.S. PATENT DOCUMENTS 6,184,888 B1 *    2/2001    Yuasa et al. ................. 345/419

FOREIGN PATENT DOCUMENTS

JP    10-208073    8/1998

OTHER PUBLICATIONS

English translation of "Virtual Reality No Kisa 4, Jinkougenjikukan No Hyouka; the basics of virual reality 4, evaluation of artificial reality", Feb. 29, 2000, Kabushikigaisha Baihukan, 1st edition.*
Reflex HMD—A development of Reflex HMD—Head Mounted Display with Vestibular Reflex; Ryugo Kijima; Eijiroh Yamada; Takeo Ojika; vol. 6, No. 2, pp. 107-114, 2001.
Dynamic Analysis of Peripheral Skin Temperature for Affect Display of Facial Color under Force Display in a Virtual Arm Wrestling System; Takashi Yamada; Tomio Watanabe; Humber Interface Scoiety vol. 6; No. 6, pp. 23-26.

* cited by examiner

*Primary Examiner*—Kee M. Tung
*Assistant Examiner*—Michelle K. Lay
(74) *Attorney, Agent, or Firm*—Mark Montague; Cowan, Liebowitz & Latman, P.C.

(57) ABSTRACT

To provide an image processing system capable of increasing a sense of affinity for a robot at a low cost, an image processing system has an image generating device for generating computer graphics in a figure corresponding to a positional relationship between an observer, who is observing a figure of an actual object and the actual object, and the actual object; a nimbus generating device for generating a nimbus image around a periphery of the computer graphics; a combined image generating device for generating a combined image combining the computer graphics and the nimbus image; and an image display processing device for displaying the combined image on an display which is seen by the observer so that the combined image is superimposed on the actual object.

22 Claims, 14 Drawing Sheets

IMAGE PROCESSING SYSTEM, IMAGE PROCESSING APPARATUS, AND DISPLAY APPARATUS

TECHNICAL FIELD

The present invention relates to an image processing system, an image processing device and a display device for making an observer viewing a display experience virtual reality.

BACKGROUND OF THE INVENTION

Conventionally, in order to make a human have a sense of affinity for a humanoid robot or an animal-type robot simulating an animal other than a human (hereinafter, simply referred to as a "robot") which is an actual object, there have been methods attempted to give the robot an appearance similar to an actual human or animal (hereinafter, referred to as a "human or the like").

Specifically, they include a method to cover the robot with an outer skin formed by a soft material (first method), a method to project a face of a human or the like on the head portion of the robot (second method), a method to coat the surface of the robot by a retroreflector material and project an image of the entire body of a human or the like from an image projecting device using the surface of the robot as a screen (third method), and the like. These methods can make an observer feel as if the robot is a real human or the like, and reduce a sense of strangeness of the robot. The third method is disclosed in "*Virtual Reality No Kiso 4, Jinkougenjitukan No Hyouka* (the basics of virtual reality 4, evaluation of artificial reality) (supervising editor: Akira Tachi; editor: Toru Ihukube; publisher: Kabushiki-gaisha Baihukan; first edition is published on Feb. 29, 2000)."

However, in the first method, the robot needs to have facial expressions to be close to a real human or the like. To have facial expressions, the robot needs to have many actuators so that the surface of the face of the robot can freely move. Consequently, it results in an increase in the cost of the robot and a complication of controlling the actuators. In addition, since the robot imitates an appearance by having an outer skin, there is a limit that the appearance of only one type of human or the like can be provided.

Further, in the second method, since the face of the human or the like is projected on a display provided on the head portion of the robot, it becomes unnatural unless an observer views the robot from the front. Specifically, when the observer views the robot from the side or back, it can be only seen as an appearance of a robot.

Moreover, in the third method, when there exists some kind of obstacle between the robot and the image projecting device, the shadow of this obstacle will be reflected on the surface of the robot. Therefore, in such a case, it is difficult for the observer to recognize the robot as a real human or the like. Further, the observer cannot even touch the robot because his/her shadow will be reflected when he/she comes close to the robot.

Accordingly, to solve the above problems, a method is conceivable in which a head mount display (hereinafter, referred to as "HMD") is worn by an observer, and computer graphics in conjunction with movement of a robot are projected on the HMD to be superimposed on the robot.

According to this method, the computer graphics of the human or the like can be freely changed corresponding to the robot. Consequently, facial expressions and postures of the robot can be freely and easily moved. Further, by making the computer graphics of the human or the like as three dimensional computer graphics, the observer will not feel unnatural even when viewing the robot from the side or back. Further, the HMD is a goggle type display which covers eyes of the observer and projects the computer graphics in front of the eyes of the observer. Consequently, the shadow of an obstacle will not be reflected on the HMD. Moreover, the observer can also touch the robot, so that the observer can experience the virtual reality in visual and tactile ways. Therefore, the observer becomes able to feel a much stronger sense of affinity for the robot.

However, the method to project computer graphics on the HMD as described above also has problems. In order to change computer graphics of a human or the like to be projected on the HMD in conjunction with movement of a position or a posture of the robot, it is necessary to calculate space coordinates based on various data detected by sensors on the robot side or HMD side to perform image processing.

When there is a large measurement error in the detected data, or when a time needed for transmitting data or for calculating the space coordinates during image processing becomes equal to or longer than a predetermined time, there will occur a displacement between the movement of the robot and the computer graphics. Further, some kind of disturbance occurring to the robot can cause the robot to move abruptly. Also in this case, a displacement occurs between the robot and the computer graphics.

A displacement occurring by such a reason spoils the feeling of the observer (specifically, the HMD wearer), so that the emotional involvement of the observer with the robot is prevented.

On the other hand, such a displacement between the robot and the computer graphics as described above can be reduced by increasing the accuracy of image processing and the speed of image processing by enhancing the performance of the various sensors, robot and HMD. However, it is impossible to completely eliminate the displacement. Further, mounting high-performance sensors, CPU, and so on in the robot for minimally reducing the displacement leads to an increase in cost, which will be a disadvantage in the economical aspect as well.

The present invention is made to solve such problems as described above, and an object thereof is to provide an image processing system, an image processing device and a display device capable of increasing a sense of affinity for a robot at a low cost.

SUMMARY OF THE INVENTION

In order to achieve the above-described object, the inventor of the present invention constructed an image processing system which has: an image selecting device for selecting computer graphics in a figure corresponding to a figure of an actual object and a positional relationship between an observer, who is viewing the actual object, and the actual object; a nimbus generating device for generating a nimbus image around a periphery of the computer graphics; a combined image generating device for generating a combined image combining the computer graphics and the nimbus image; and an image display processing device for displaying the combined image on an display which is viewed by the observer so that the combined image is superimposed on the actual object. By constructing such a system, it becomes possible to select computer graphics which correspond to a figure of an actual object and then generate a nimbus. As a result, even when a displacement occurs between movement of the actual object and the computer graphics, the displacement can be hidden. Therefore, the observer can contact the actual object without having a sense of strangeness, and can have a sense of affinity for a robot at a low cost.

Further, another invention is an image processing system which has: an image processing device having an image selecting device for selecting computer graphics in a figure corresponding to a figure of an actual object and a positional relationship between an observer, who is viewing the actual object, and the actual object, a nimbus generating device for generating a nimbus image around a periphery of the computer graphics, a combined image generating device for generating a combined image combining the computer graphics and the nimbus image, and a combined image sending device for sending the combined image to the observer side; and a display device having an image display processing device for displaying the combined image, which is sent from the combined image sending device, on an display which is viewed by the observer so that the combined image is superimposed on the actual object. By constructing such a system, it becomes possible to select computer graphics which correspond to a figure of an actual object and then generate a nimbus. As a result, even when a displacement occurs between movement of the actual object and the computer graphics, it is possible to generate in the image processing device a combined image with a nimbus image for hiding the displacement, send the generated combined image to an HMD, and project the combined image on a display device which is viewed by the observer. Therefore, the observer can contact the actual object without having a sense of strangeness, and can have a sense of affinity for a robot at a low cost.

Further, another invention is an image processing system which has: an image generating device for generating computer graphics in a figure corresponding to a figure of an actual object and a positional relationship between an observer, who is viewing the actual object, and the actual object; a nimbus generating device for generating a nimbus image around a periphery of the computer graphics; a combined image generating device for generating a combined image combining the computer graphics and the nimbus image; and an image display processing device for displaying the combined image on an display which is viewed by the observer so that the combined image is superimposed on the actual object. By constructing such a system, it becomes possible to generate computer graphics and nimbus which correspond to a figure of an actual object. As a result, even when a displacement occurs between movement of the actual object and the computer graphics, the displacement can be hidden. Therefore, the observer can contact the actual object without having a sense of strangeness, and can have a sense of affinity for a robot at a low cost.

Further, another invention is an image processing system which has: an image processing device having an image selecting device for selecting computer graphics in a figure corresponding to a figure of an actual object and a positional relationship between an observer, who is observing the actual object, and the actual object, a nimbus generating device for generating a nimbus image around a periphery of the computer graphics, a combined image generating device for generating a combined image combining the computer graphics and the nimbus image, and a combined image sending device for sending the combined image to the observer side; and a display device having an image display processing device for displaying the combined image, which is sent from the combined image sending device, on an display which is viewed by the observer so that the combined image is superimposed on the actual object. By constructing such a system, it becomes possible to generate computer graphics and nimbus which correspond to a figure of an actual object. As a result, even when a displacement occurs between movement of the actual object and the computer graphics, it is possible to generate in the image processing device a combined image with a nimbus image for hiding the displacement, send the generated combined image to an HMD, and project the combined image on a display device which is viewed by the observer. Therefore, the observer can contact the actual object without having a sense of strangeness, and can have a sense of affinity for a robot at a low cost.

Further, another invention is an image processing system in which the nimbus generating device further estimates an error in measurement of a distance between the observer and the actual object, and generates based on the error the nimbus image having an adequate thickness for preventing the actual object from being seen protruding from a periphery of the computer graphics. Thus, even when the distance between the observer and the actual object is not detected accurately, the computer graphics can adequately hide the actual object. Therefore, the observer can enjoy the computer graphics naturally.

Further, another invention is an image processing system in which the nimbus generating device further generates the nimbus image having an adequate thickness for not showing the observer a displacement which occurs between the actual object and the computer graphics when the actual object or the observer moves. Consequently, even when the generation of the computer graphics cannot follow movement of the actual object or the observer, the computer graphics can adequately hide the actual object. Therefore, the observer can enjoy the computer graphics naturally.

Further, another invention is an image processing system which further has a detecting device for detecting at least one of a distance and an angle between a display which is viewed by the observer and the actual object and a direction of the actual object seen from the observer. Consequently, it becomes possible to generate the computer graphics following changes in actions of the actual object and the observer with high precision.

Further, another invention is an image processing system in which the actual object is a humanoid robot or an animal-type robot other than a human, which can freely move. Consequently, for the observer, the robot is seen as a character of computer graphics. Therefore, the observer can enjoy virtual reality as if a real character is present.

Further, another invention is an image processing system which further has a communication device for receiving the computer graphics from outside via a network. Consequently, the observer can easily obtain his/her favorite computer graphics from outside. Therefore, the observer can enjoy plural characters by having one actual object.

Further, another invention is an image processing system in which the computer graphics further have a lacking area for showing the observer a second actual object having a part which exists on the observer side than the actual object; and the nimbus generating device also generates a nimbus image around a periphery of the lacking area. Consequently, even when the computer graphics are superimposed on the actual object in a state that the second actual object is in contact with the actual object, a part or the whole of the second actual object can be seen by the observer. For example, when a humanoid robot (actual object) is holding a chocolate (second actual object), the observer can observe a part of the chocolate that is on the observer side than the humanoid robot. Therefore, the observer observing the humanoid robot holding the chocolate can recognize a sight that an idol personality is holding a chocolate.

Further, another invention is an image processing device which has: an image selecting device for selecting computer graphics in a figure corresponding to a figure of an actual object and a positional relationship between an observer, who is viewing the actual object, and the actual object; a nimbus generating device for generating a nimbus image around a periphery of the computer graphics; and a combined image generating device for generating a combined image combining the computer graphics and the nimbus image. Thus, it is possible to select computer graphics which correspond to a figure of the actual object and then generate the nimbus. As a result, even when a displacement occurs between movement of the actual object and the computer graphics; the displacement can be hidden. Therefore, the observer can contact the actual object without having a sense of strangeness, and can have a sense of affinity for a robot at a low cost. Moreover, by separating the display device displaying the combined image and the image processing device, load on the display device side can be decreased.

Further, another invention is an image processing device which has: an image generating device for generating computer graphics in a figure corresponding to a figure of an actual object and a positional relationship between an observer, who is viewing the actual object, and the actual object; a nimbus generating device for generating a nimbus image around a periphery of the computer graphics; and a combined image generating device for generating a combined image combining the computer graphics and the nimbus image. Thus, it is possible to generate computer graphics and a nimbus which correspond to a figure of an actual object. As a result, even when a displacement occurs between movement of the actual object and the computer graphics, the displacement can be hidden. Therefore, the observer can contact the actual object without having a sense of strangeness, and can have a sense of affinity for a robot at a low cost. Moreover, by separating the display device displaying the combined image and the image processing device, load on the display device side can be decreased.

Further, another invention is an image processing device in which the nimbus generating device further estimates an error in measurement of a distance between the observer and the actual object, and generates based on the error the nimbus image having an adequate thickness for preventing the actual object from being seen protruding from a periphery of the computer graphics. Consequently, even when the distance between the observer and the actual object is not detected accurately, the computer graphics can adequately hide the actual object. Therefore, the observer can enjoy the computer graphics naturally.

Further, another invention is an image processing device in which the nimbus generating device further generates the nimbus image having an adequate thickness for not showing the observer a displacement which occurs between the actual object and the computer graphics when the actual object or the observer moves. Consequently, even when the generation of the computer graphics cannot follow movement of the actual object or the observer, the computer graphics can adequately hide the actual object. Therefore, the observer can enjoy the computer graphics naturally.

Further, another invention is an image processing device which further has a detecting device for detecting at least one of a distance and an angle between a display which is viewed by the observer and the actual object and a direction of the actual object seen from the observer. Consequently, it becomes possible to generate the computer graphics following changes in actions of the actual object and the observer with high precision.

Further, another invention is an image processing device which further has a communication device for receiving the computer graphics from outside via a network. Consequently, the observer can easily obtain his/her favorite computer graphics from outside. Therefore, the observer can enjoy plural characters by having one actual object.

Further, another invention is an image processing device in which the computer graphics have a lacking area for further showing the observer a second actual object having a part which exists on the observer side than the actual object, and the nimbus generating device also generates a nimbus image around a periphery of the lacking area. Consequently, even when the computer graphics are superimposed on the actual object in a state that the second actual object is in contact with the actual object, a part or the whole of the second actual object can be seen by the observer. For example, when a humanoid robot (actual object) is holding a chocolate (second actual object), the observer can observe a part of the chocolate that is on the observer side than the humanoid robot. Therefore, the observer observing the humanoid robot holding the chocolate can recognize a sight that an idol personality is holding a chocolate.

Further, another invention is an image processing device which has: means for selecting computer graphics in a figure corresponding to a figure of an actual object and a positional relationship between an observer, who is viewing the actual object, and the actual object; means for generating a nimbus image around a periphery of the computer graphics; and means for combining the computer graphics and the nimbus image. Thus, it is possible to select computer graphics which correspond to a figure of an actual object and then generate a nimbus. As a result, even when a displacement occurs between movement of the actual object and the computer graphics, the displacement can be hidden. Therefore, the observer can contact the actual object without having a sense of strangeness, and can have a sense of affinity for a robot at a low cost. Moreover, by separating the display device displaying the combined image and the image processing device, load on the display device side can be decreased. The respective means mentioned here have broad meanings including a device such as a CPU fixed to an electronic circuit substrate, and a program product operated by the device and by processing of the device. Therefore, the above-described respective means may be only hardware such as a device, or may be a combination of the hardware and software such as a program product. Hereinafter, although it is not mentioned each time, it will be understood that the one described as "means" has the above-described broad meanings.

Further, another invention is an image processing device which has: means for generating computer graphics in a figure corresponding to a figure of an actual object and a positional relationship between an observer, who is viewing the actual object, and the actual object; means for generating a nimbus image around a periphery of the computer graphics; and means for combining the computer graphics and the nimbus image. Thus, it is possible to generate computer graphics and a nimbus which correspond to a figure of an actual object. As a result, even when a displacement occurs between movement of the actual object and the computer graphics, the displacement can be hidden. Therefore, the observer can contact the actual object without having a sense of strangeness, and can have a sense of affinity for a robot at a low cost. Moreover, by separating the display device displaying the combined image and the image processing device, load on the display device side can be decreased.

Further, another invention is an image processing device in which the means for generating a nimbus image further estimates an error in measurement of a distance between the observer and the actual object, and generates based on the error the nimbus image having an adequate thickness for preventing the actual object from being seen protruding from a periphery of the computer graphics. Thus, even when the distance between the observer and the actual object is not detected accurately, the computer graphics can adequately hide the actual object. Therefore, the observer can enjoy the computer graphics naturally.

Further, another invention is an image processing device in which the means for generating a nimbus image further generates the nimbus image having an adequate thickness for not showing the observer a displacement which occurs between the actual object and the computer graphics when the actual object or the observer moves. Thus, even when the generation of the computer graphics cannot follow movement of the actual object or the observer, the computer graphics can adequately hide the actual object. Therefore, the observer can enjoy the computer graphics naturally.

Further, another invention is an image processing device which further has means for detecting at least one of a distance and an angle between a display which is viewed by the observer and the actual object and a direction of the actual object seen from the observer. Thus, it becomes possible to generate the computer graphics following changes in actions of the actual object and the observer with high precision.

Further, another invention is an image processing device which further has means for receiving the computer graphics from outside via a network. Thus, the observer can easily obtain his/her favorite computer graphics from outside. Therefore, the observer can enjoy plural characters by having one actual object.

Further, another invention is an image processing device in which the computer graphics further have a lacking area for showing the observer a second actual object having a part which exists on the observer side than the actual object, and the means for generating a nimbus image also generates a nimbus image around a periphery of the lacking area. Thus, even when the computer graphics are superimposed on the actual object in a state that the second actual object is in contact with the actual object, a part or the whole of the second actual object can be seen by the observer. For example, when a humanoid robot (actual object) is holding a chocolate (second actual object), the observer can observe a part of the chocolate that is on the observer side than the humanoid robot. Therefore, the observer observing the humanoid robot holding the chocolate can recognize a sight that an idol personality is holding a chocolate.

Further, another invention is a display device which has an image display processing device for displaying a combined image, which is generated by combining a nimbus image generated around a periphery of computer graphics in a figure corresponding to a figure of an actual object and a positional relationship between an observer, who is viewing the actual object, and the actual object, on a display which is viewed by the observer so that the combined image is superimposed on the actual object. Consequently, it is possible to select computer graphics which correspond to a figure of an actual object and then generate its nimbus. As a result, even when a displacement occurs between movement of the actual object and the computer graphics, the displacement can be hidden. Therefore, the observer can contact the actual object without having a sense of strangeness, and can have a sense of affinity for a robot at a low cost. Moreover, by separating the display device displaying the combined image and the image processing device generating the combined image, load on the display device side can be decreased.

Further, another invention is a display device in which the computer graphics have a lacking area for showing the observer a second actual object having a part which exists on the observer side than the actual object, and the nimbus image also exists around the lacking area. Thus, even when the computer graphics is superimposed on the actual object in a state that the second actual object is in contact with the actual object, a part or the whole of the second actual object can be seen by the observer. For example, when a humanoid robot (actual object) is holding a chocolate (second actual object), the observer can observe a part of the chocolate that is on the observer side than the humanoid robot. Therefore, the observer observing the humanoid robot holding the chocolate can recognize a sight that an idol personality is holding a chocolate.

DETAILED DESCRIPTION OF THE INVENTION

Hereinafter, preferred embodiments of the present invention will be described with reference to the drawings. Incidentally, an actual object will be hereinafter described as a robot represented by a humanoid robot, but the actual object may be one that does not move, such as a mannequin. In addition, instead of respective devices which will be described below, processing identical to those of the respective devices may be executable by collaboration of the respective devices with a program product.

(First Embodiment 1)

Figure 1:
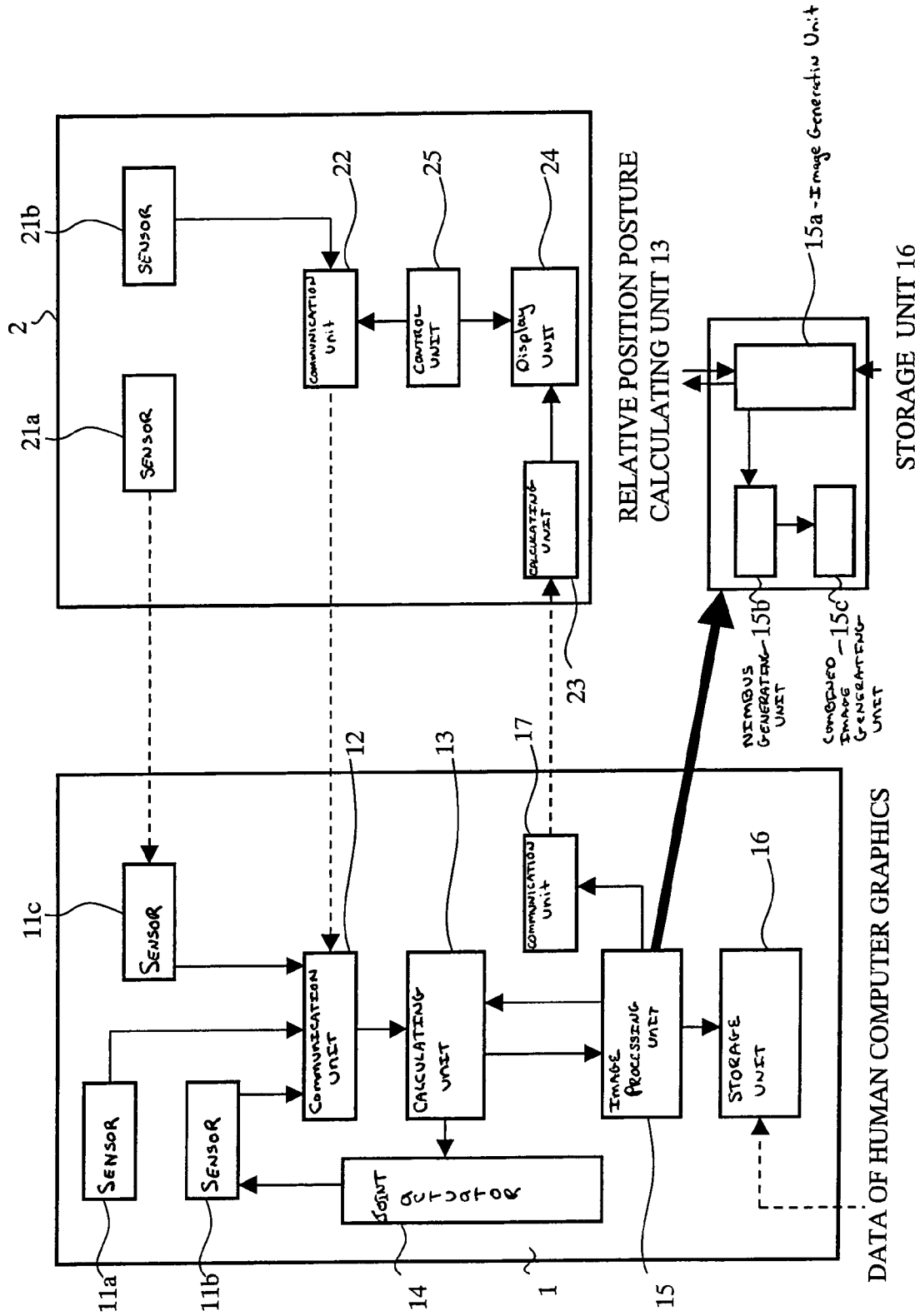
FIG. 1 is a block diagram showing a configuration of an image processing system of the present invention.
Figure 2:
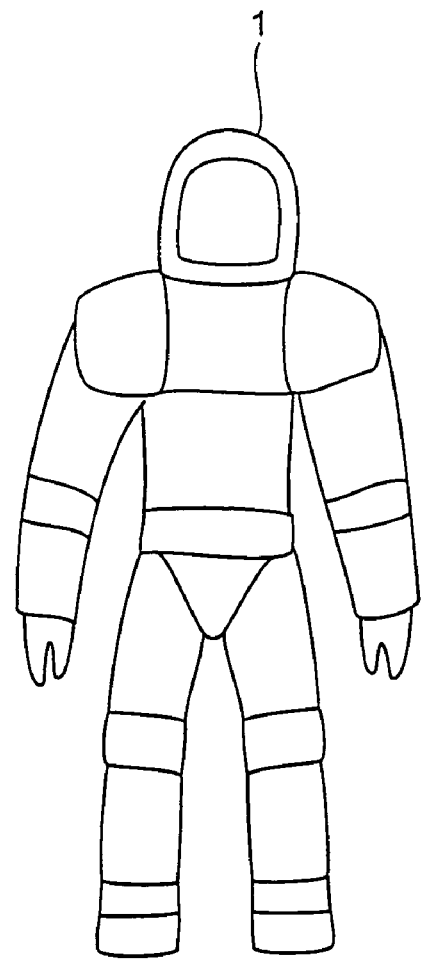
FIG. 2 is a view showing an appearance of a humanoid robot that is an image processing device of the present invention.

FIG. 1 is a block diagram showing a configuration of an image processing system of the present invention. As shown in FIG. 1, the image processing system of the present invention is constituted by a humanoid robot 1, which is an image processing device, and an HMD 2, which is a display device. FIG. 2 is a view showing an appearance of the humanoid robot 1. The humanoid robot 1 can move with two legs, and respective joints such as a neck, hands, legs and so on are configured to move.

As shown in FIG. 1, the humanoid robot 1 has sensors 11a, 11b, and 11c each of which is one aspect of a detecting device, a communication unit 12, a relative position posture calculating unit 13 that is one aspect of an image generating device, a joint actuator 14, an image generating device, an image processing unit 15 that is one aspect of a nimbus generating device and a combined image generating device, a storage unit 16, and a communication unit 17 that is one aspect of a communication device. Further, the HMD 2 has sensors 21a and 21b each of which is one aspect of the detecting device, communication units 22 and 23, a three-dimensional image displaying unit 24 that is one aspect of an image display processing device, and a control unit 25.

The sensor 11a is a sensor which detects a contact pressure applied to the surface of the humanoid robot 1. The sensor 11b is a sensor which detects angles of respective joints for measuring a posture of the humanoid robot 1. The sensor 11c is a sensor which measures and detects a position of the HMD 2, in other words, a relative distance between an observer wearing the HMD 2 and the humanoid robot 1. Data of the respective sensors 11a, 11b, and 11c (body surface contact pressure data, joint angle data and relative distance information) are sent to the communication unit 12.

The communication unit 12 receives respective data sent from the respective sensors 11a, 11b, and 11c, and receives data from the HMD 2. The data sent from the HMD 2 is a posture data of a head portion of a human (head posture data) measured by the sensor 21b in the HMD 2. The communication unit 12 is a component which sends data from all of these sensors 11a, 11b, and 11c to the relative position posture calculating unit 13. Incidentally, in this embodiment, the data communication between the humanoid robot 1 and the HMD 2 is assumed to be performed wirelessly via an antenna (not-shown), but the data communication is not limited to this, which may be one performed via a cable.

The relative position posture calculating unit 13 calculates data of target angles of respective joints so that the humanoid robot 1 takes a predetermined posture, based on the data detected respectively by the sensors 11a and 11b among the data sent from the communication unit 12. Further, the relative position posture calculating unit 13 obtains a posture of the humanoid robot 1 and a relative positional relationship between the humanoid robot 1 and the HMD 2 based on all the data (body surface contact pressure data, joint angle data, relative distance information and head posture data) sent from the communication unit 12, calculates from these information relative position posture data that is a shape of the humanoid robot 1 to be projected in a visual range of the observer who is wearing the HMD 2 and viewing the robot 1, and sends data for generating computer graphics to the image processing unit 15.

The joint actuator 14 is a drive mechanism which changes angles of respective joints based on target joint angle data calculated by the relative position posture calculating unit 13. The image processing unit 15 is constituted by an image generating unit 15a that is one aspect of an image generating device, a nimbus generating unit 15b that is one aspect of a nimbus generating device, and a combined image generating unit 15c that is one aspect of a combined image generating device. The image processing unit 15 reads data of human computer graphics stored in the storage unit 16 based on the relative position posture data calculated in the relative position posture calculating unit 13, performs respective processing of image generation, outline extraction, nimbus generation and image composition on the data of the human computer graphics to thereby generate a combined image (=processed computer graphics data). Here, the outline extraction is performed in the image generating unit 15a. The image processing unit 15 is generally constituted by a central processing unit (CPU), an image processing processor, and a memory, but it may be a hardware configuration other than this. Details of processing operation of the image processing unit 15 will be described later.

The storage unit 16 is a storage medium which stores the data of human computer graphics. The data of human computer graphics is read by, for example, a drive (not-shown) from a medium such as a CD-ROM and then stored in the storage unit 16. Here, as the data of human computer graphics, for example, computer graphics data or the like of a celebrity such as a performing artist is conceivable. The communication unit 17 is a component which sends processed computer graphics data to the HMD 2 when it receives the processed data processed in the image processing unit 15.

Figure 3:
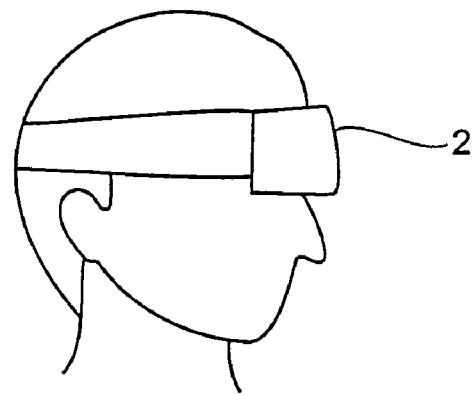
FIG. 3 is a view showing an appearance of a head mount display that is a display device of the present invention.

The HMD 2 is, as shown in FIG. 3, a goggle-type display which is worn on the head portion of an observer. The HMD 2 is a transmissive-type head mount display which transmits a light via a part of an image projecting unit in front of the eyes of the observer where an image is not projected. Therefore, the observer can see an actual object (which is an object that actually exists, having an opposite meaning to the three-dimensional image of computer graphics), one example of which is the humanoid robot 1, through the part of the image projecting unit of the HMD 2 where an image is not projected.

As shown in FIG. 1, the sensor 21a inside the HMD 2 is a sensor which measures and detects a position of the humanoid robot 1, in other words, a relative distance between the observer wearing the HMD 2 and the humanoid robot 1. Further, the sensor 21b is a sensor which detects a posture (direction, slant angle, or the like of a face) of the head portion of the observer wearing the HMD 2.

The communication unit 22 is a component which sends head posture data detected by the sensor 21b to the humanoid robot 1. Further, the communication unit 23 is a component which receives processed computer graphics data sent from the humanoid robot 1.

The three-dimensional image displaying unit 24 is a component which displays the processed computer graphics data received by the communication unit 23. The control unit 25 is a component which controls operation of respective units of the HMD 2.

Next, image processing of the humanoid robot 1 will be described with reference to FIG. 4 to FIG. 8.

While the power is on, the humanoid robot 1 constantly detects the body surface contact pressure data and the joint angle data by the sensor 11a and the sensor 11b, respectively. Then, the body surface contact pressure data and the joint angle data detected by the sensor 11a and the sensor 11b are sent via the communication unit 12 to the relative position posture calculating unit 13. The relative position posture calculating unit 13 calculates the target joint angle data so that the humanoid robot 1 takes a predetermined posture, based on the body surface contact pressure data and the joint angle data. Then, the joint angle actuator 14 receives the target joint angle data to adjust respective joints of the humanoid robot 1 to the target joint angles. Consequently, it becomes possible to change the humanoid robot 1 to various postures to move around.

When the sensor 11c detects the HMD 2, it turns to a mode for performing image processing on the data of human computer graphics and sending the data to the HMD 2. The sensor 11c measures a relative distance to the HMD 2 and sends information regarding the relative distance via the communication unit 12 to the relative position posture calculating unit 13. Further, the communication unit 12 receives the head posture data sent from the communication unit 22 of the HMD 2 and sends the head posture data to the relative position posture calculating unit 13.

The relative position posture calculating unit 13 calculates the relative position posture data based on all the sensor data, namely, the body surface contact pressure data, the joint angle data, the relative position information, and the head posture data, and sends the relative position posture data to the image processing unit 15. The image processing unit 15 performs image processing on the data of human computer graphics based on the relative position posture data as below.

Figure 4:
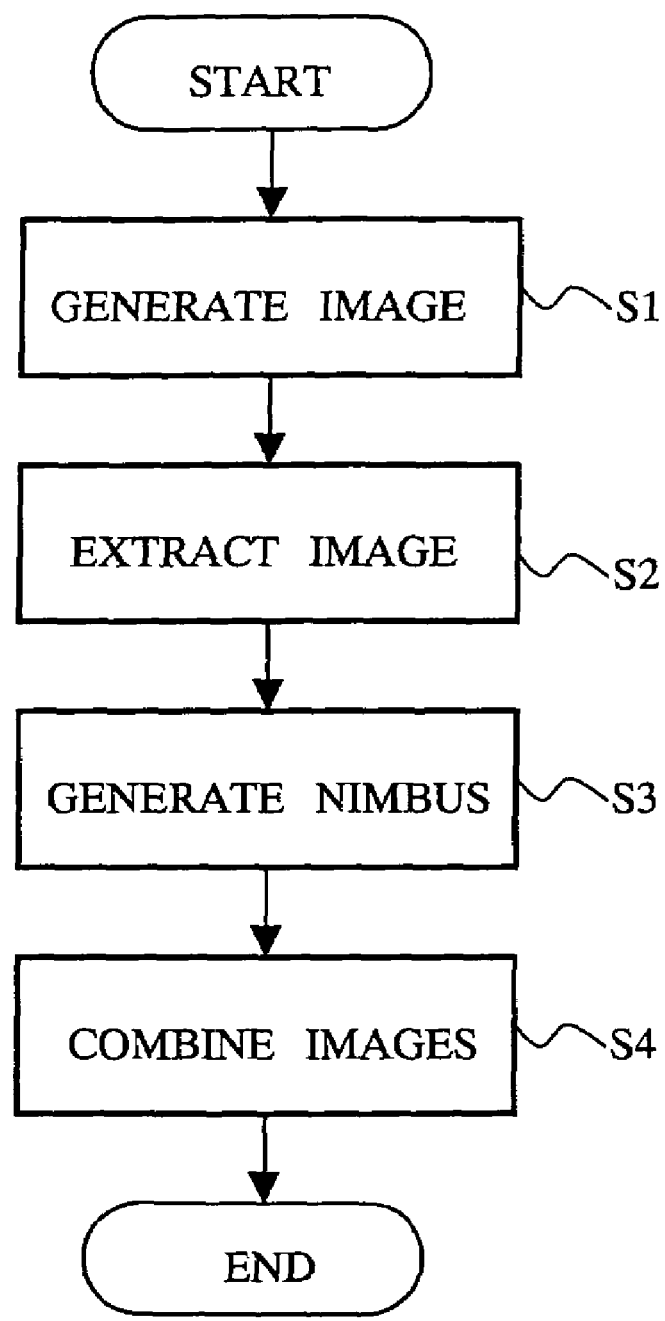
FIG. 4 is a flowchart for describing a flow of operation of image processing in the image processing device of FIG. 2.

FIG. 4 is a flowchart for briefly describing a flow of image processing operation of the image processing unit 15. Upon reception of the relative position posture data, the image processing unit 15 first reads the data of human computer graphics stored in the storage unit 16 and convert the data of human computer graphics into computer graphics corresponding to the relative position posture data (Step S1).

Figure 5:
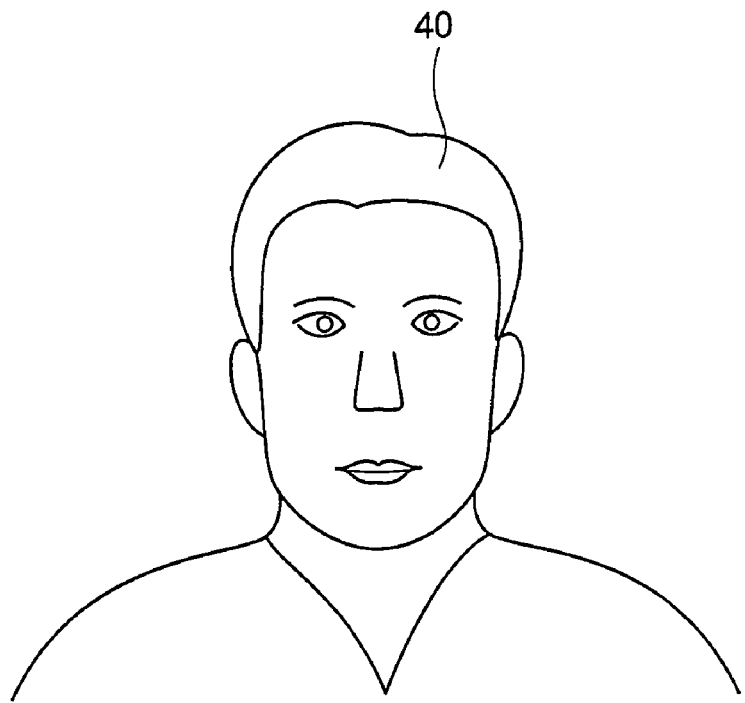
FIG. 5 is a view showing one example of computer graphics generated by the image processing device of FIG. 2.

Here, the computer graphics do not mean pictures of all kinds of poses drawn by a computer, but mean so-called three-dimensional computer graphics having three-dimensional information of joint positions and surface shapes, which are three-dimensional figures drawn by a computer. The image processing unit 15 is capable of freely moving the joints of the computer graphics and changing a view point thereof. Specifically, by moving the humanoid robot 1 by setting space coordinates and giving a track to respective joint positions of the humanoid robot 1 based on the relative position posture data, the image processing unit 15 generates computer graphics corresponding to the posture of the humanoid robot 1. An example of computer graphics 40 on which the image generation processing is performed by the image processing unit 15 as above is shown in FIG. 5.

Incidentally, the three-dimensional computer graphics are different from a so-called stereoscopic image such that an object (picture) in front of eyes is stereoscopically floating by utilizing a false sense of brain due to a displacement of images such as photography seen by the left eye and the right eye, but processing for stereoscopy may be further performed on the three-dimensional computer graphics.

Figure 6:
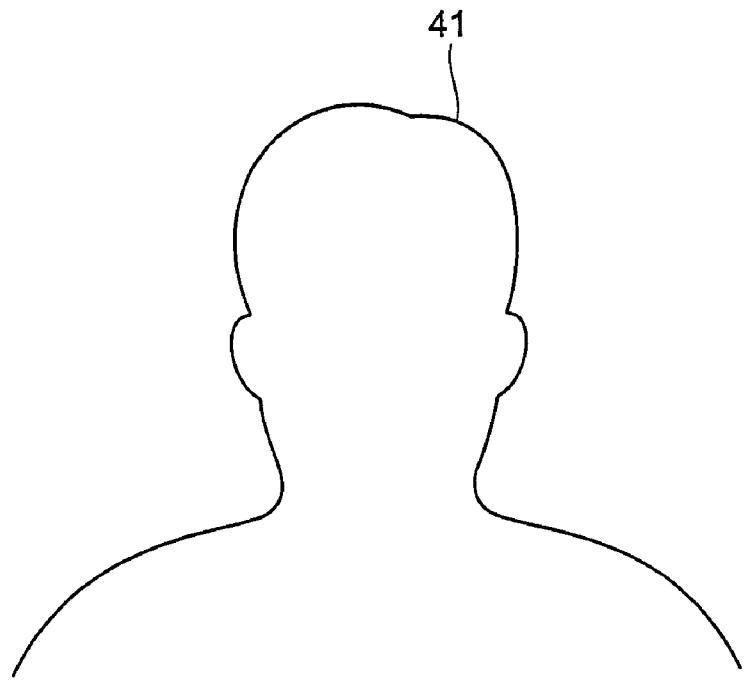
FIG. 6 is a view showing an outline of computer graphics extracted by the image processing device of FIG. 2.
Figure 7:
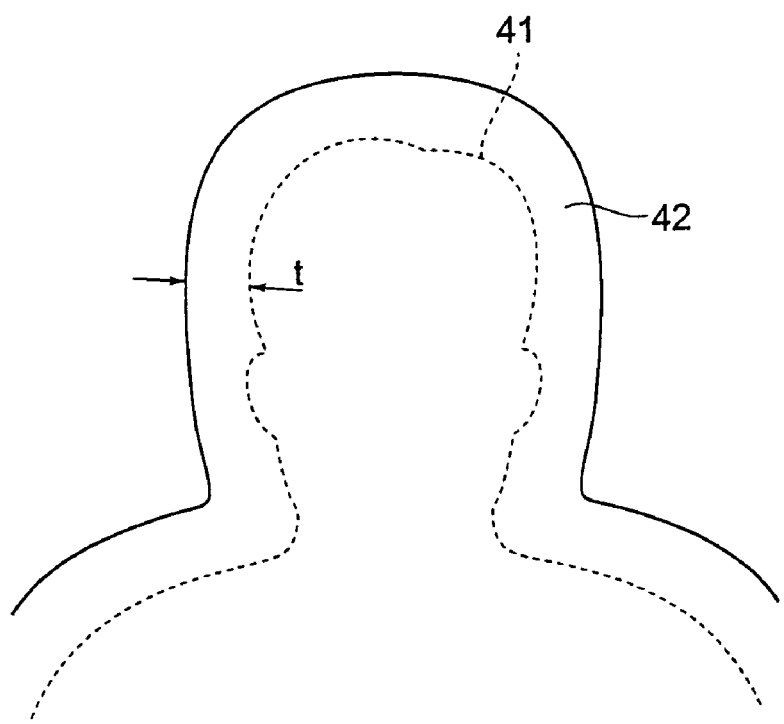
FIG. 7 is a view showing one example of a nimbus generated by the image processing device of FIG. 2.

Next, the image processing unit 15 extracts an outline of the computer graphics 40 which are image processed (Step S2). A result of the extraction processing of an outline 41 by the image processing unit 15 as above is shown in FIG. 6. Next, the image processing unit 15 generates a nimbus 42 along the periphery of the extracted outline 41 of the computer graphics 40 (Step S3). This nimbus 42 is a light for hiding a displacement between the humanoid robot 1 and the computer graphics 40. A result of generation processing of the nimbus 42 by the image processing unit 15 as above is shown in FIG. 7.

Here, due to its purpose, the nimbus 42 needs to have a width t that is substantially sufficient to hide the displacement between the movement of the humanoid robot 1 and the computer graphics 40. Therefore, the width t of the nimbus needs to have a thickness that can cover the displacement which occurs when respective joints and the like of the humanoid robot 1 are moving at the maximum speed.

Figure 8:
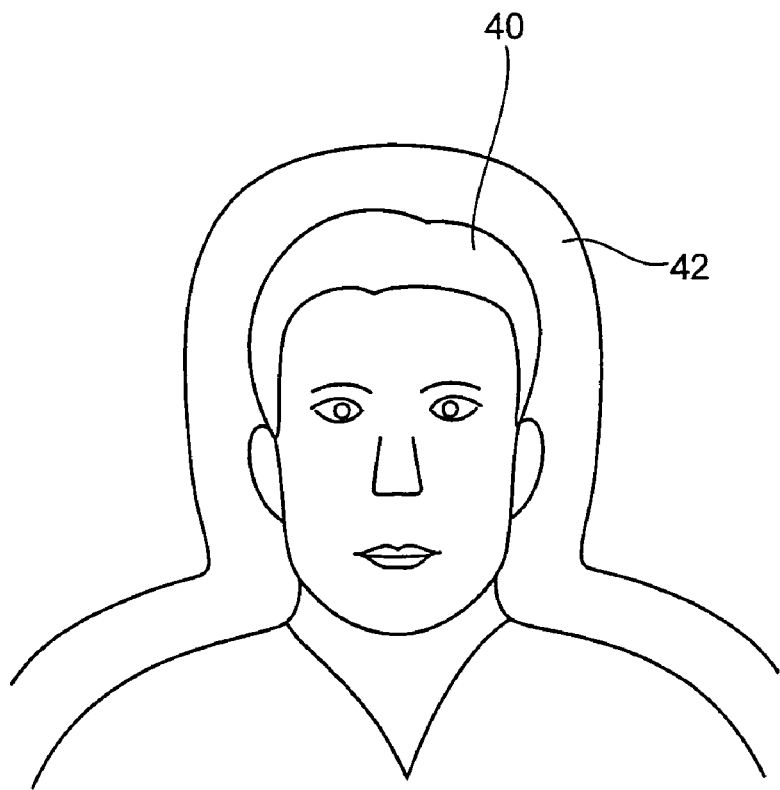
FIG. 8 is a view showing one example of a combined image of combining the computer graphics and the nimbus in the image processing device of FIG. 2.

Next, the image processing unit 15 combines the generated computer graphics 40 and the image of the nimbus 42 (Step S4). An example of a combined image which is combined by the image processing unit 15 as above is shown in FIG. 8. As shown in FIG. 8, by adding the nimbus 42 along the periphery of the computer graphics 40, a slight displacement between the humanoid robot 1 and the computer graphics 40 can be hidden, and the presence of the nimbus 42 along the periphery of the computer graphics 40 does not make an observer feel a sense of strangeness.

The image processing unit 15 sends, as shown in FIG. 1, the processed computer graphics data, in which the nimbus 42 is combined with the computer graphics 40, to the HMD 2 via the communication unit 17. When the communication unit 23 receives the processed computer graphics data sent from the communication unit 17 of the humanoid robot 1, the HMD 2 sends the processed computer graphics data to the three-dimensional image displaying unit 24. The three-dimensional image displaying unit 24 displays the processed computer graphics on a not-shown image projecting unit so that the processed computer graphics data is superimposed on the movement of the humanoid robot 1. The observer wearing the HMD 2 can view the computer graphics 40 with the nimbus 42 superimposed on the humanoid robot 1 in the HMD 2. Consequently, the observer does not sense the displacement between the humanoid robot 1 and the computer graphics 40.

Incidentally, while the data of human computer graphics being superimposed on the humanoid robot 1 is displayed on the HMD 2, when the observer (user) wearing the HMD 2 touches the humanoid robot 1, the sensor 11a of the humanoid robot 1 senses this touch. The image processing unit 15 may be configured to change the facial expression of the human image by performing image processing on the data of human computer graphics, as a result of the sensing. Further, it may also be configured to change the facial expression of the human to be angry or to smile according to a predetermined setting in a program product depending on the location or intensity of the touch by the observer.

As described above, according to this embodiment, since the nimbus 42 is added along the periphery of the computer graphics 40 by the image processing unit 15 of the humanoid robot 1, a displacement can be hidden when it occurs between the movement of the robot and the computer graphics 40, so that the observer no longer recognizes the displacement. As a result, it becomes possible for the observer to be emotionally involved easily with the humanoid robot 1. Further, the observer can actually touch the humanoid robot 1, so that the observer can further enjoy the feeling of contact with the human of the computer graphics.

Incidentally, the image processing device of the present invention is expected to be utilized for various uses other than toy-like uses. Specifically, first, by reproducing data of human computer graphics of a performing artist who is the user's favorite, it can be enjoyed as a three-dimensional poster for virtually contacting the performing artist. Moreover, by mounting a conversation device in the humanoid robot 1, it can be a quite effective advertising medium.

Further, it is conceivable that the user enjoys a walk, sports, or the like with the humanoid robot 1. Further, it is conceivable that, by saving data of one's own human computer graphics before his/her death, it can ease the family's sorrow after his/her death. Moreover, it is also expected to be utilized in caring a patient or an elderly person or for in a welfare purpose.

Further, in this embodiment, the relative position posture calculating unit 13 and the image processing unit 15 are provided on the humanoid robot 1 side, but they are not limited thereto. The relative position posture calculating unit 13 and the image processing unit 15 may be provided on the HMD 2 side. In this case, the body surface contact pressure data and the joint angle data are sent from the communication unit 12 of the humanoid robot 1 to the HMD 2, the relative position posture data is calculated on the HMD 2 side based on these data, and the image processing of the data of human computer graphics is performed based on this relative position posture data.

Next, a method of setting an optimum nimbus 42 will be described based on the drawings. An error exists in measurement of a relative position between the humanoid robot 1 and the HMD 2. Due to this measurement error, there is a possibility that the humanoid robot 1 is seen protruding from the periphery of the computer graphics 40. To prevent such a problem, the thickness of the nimbus 42 to be added to the computer graphics 40 is optimized. Specifically, as the thickness of the nimbus 42 is made thicker, the risk of the humanoid robot 1 to be seen decreases, but the appearance of the computer graphics 40 becomes more unnatural. Therefore, it is preferable to display the nimbus 42 having a thickness that is sufficient to hide the above-described displacement and is the minimum as well. Hereinafter, a method of calculating the optimum thickness of the nimbus 42 by dividing it into a depth direction and up/down and right/left directions will be described.

First, a method of calculating the thickness of the nimbus 42 based on a measurement error in the depth direction will be described.

Figure 9:
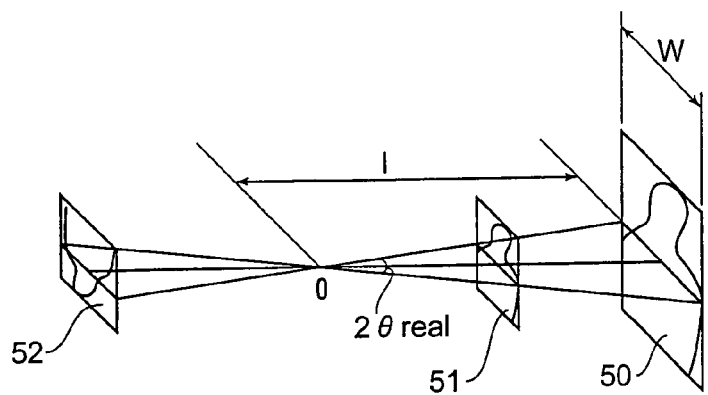
FIG. 9 is a pinhole camera model of human vision.

FIG. 9 is a pinhole camera model of human vision. When the origin 0 (zero) is equivalent to the center of a lens, and a true distance from the origin 0 (zero) to an object 50 that is the target point is l (ell), it is supposed that the measurement value of the sensor including an error is within "l(1±α)." A visual angle taken in a visual field by the object 50, which exists at the distance l and has a width w, is "2 θ real". In this case, by projecting computer graphics 51 having a width equivalent to the visual angle "2 θ real" on a display unit of the HMD 2, the object 50 can be hidden by the computer graphics 51. Incidentally, in the retina of human, computer graphics 52 having the width equivalent to the visual angle "2 θ real" is reflected.

Figure 10:
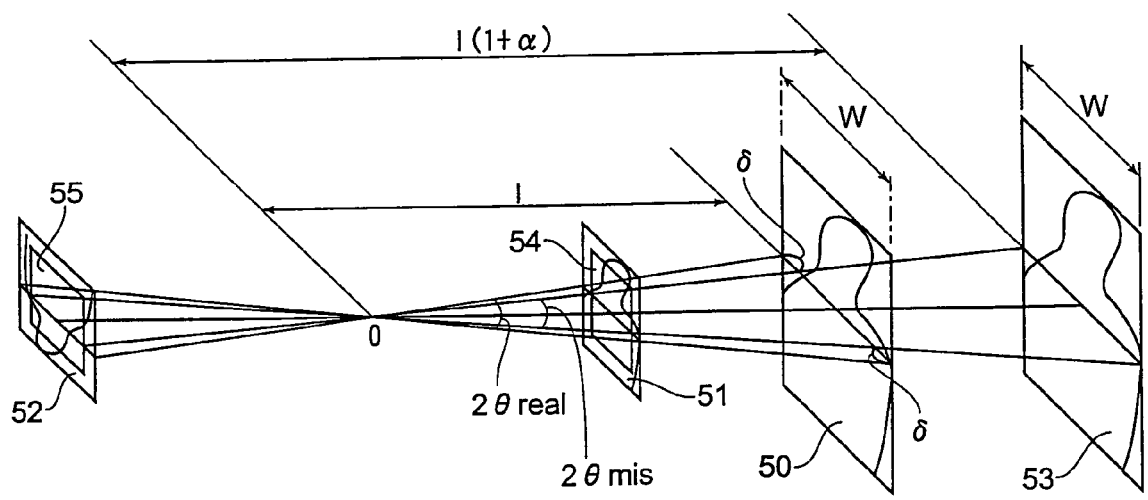
FIG. 10 is a view showing a displacement between an actual object and computer graphics in a case that a measurement error exists in a depth direction of the actual object.

On the other hand, as shown in FIG. 10, when a distance from the origin 0 (zero) to the object 50 that is the target point is judged to be l(1+α), computer graphics 54 having a width equivalent to a visual angle "2 θ mis" taken by an object 53 which exists at the distance l(1+α) and has a width w are displayed on the display unit of the HMD 2. Then, since θ real>θ mis, the object 50 is seen protruding from the computer graphics 51 displayed on the HMD 2. The width of the protrusion at this time can be calculated using the following equation 1 and equation 2.

$$l(1+\alpha)\tan\theta\ mis = w \qquad \text{Equation 1}$$

$$l\tan\theta\ real = w \qquad \text{Equation 2}$$

Thus, the equation 3 can be derived.

$$\tan\theta\ mis = (1/1+\alpha)\tan\theta\ real$$

Thus, the protruding width δ can be obtained as shown by the equation 4.

$$\begin{aligned}\delta &= l(\tan\theta\ real - \tan\theta\ mis) \qquad \text{Equation 4}\\ &= l\{\tan\theta\ real - (1/1+\alpha)\tan\theta\ real\}\\ &= l\tan\theta\ real(\alpha/1+\alpha)\end{aligned}$$

As a result, for example, when a robot having a shoulder width of 50 cm exists at 1 m front of the observer, the sensor 11c is an infrared distance sensor and a ultrasonic distance sensor, and their measurement error is 1 cm, α=0.01 is obtained. Also, tan θ real=0.25 is obtained. Accordingly, the protruding width becomes 1×0.25×(0.01/1.01), namely, 0.0025 m. Therefore, when the thickness of the nimbus 42 is 2.5 mm, the protrusion can be covered.

Next, a method of calculating the thickness of the nimbus 42 based on errors in up/down directions and in right/left directions will be described. Incidentally, for the sake of simplification, two points out of three points used for trilateration will be described.

Figure 11:
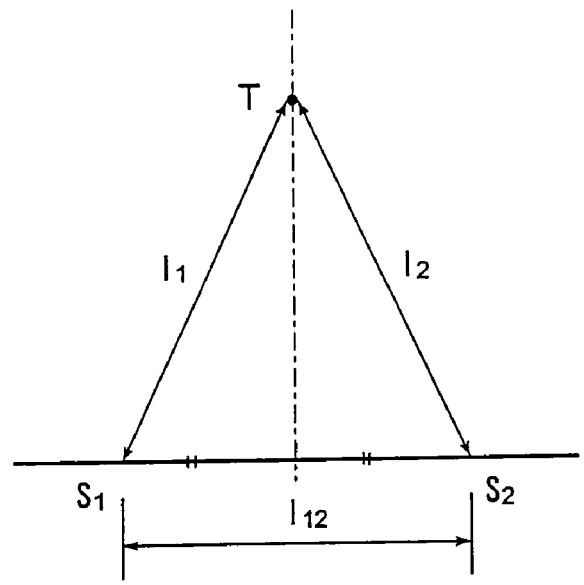
FIG. 11 is a view schematically showing a state of viewing from both eyes an actual object at the front.
Figure 12:
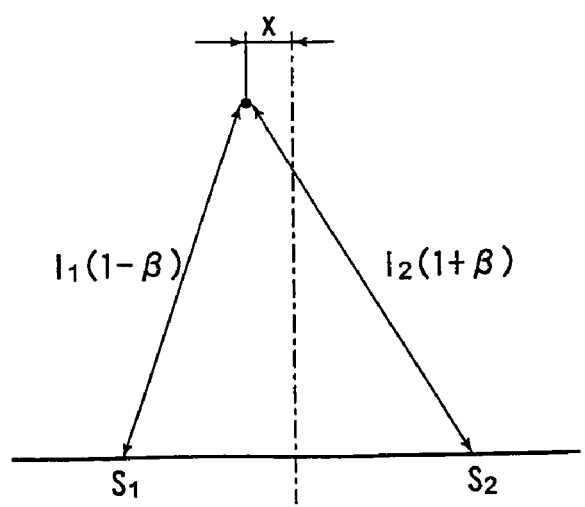
FIG. 12 is a view showing a displacement between the actual object and the computer graphics in a case that a measurement error in a right/left directions exists in a state of FIG. 11.

As shown in FIG. 11, distances from points $S_1$ and $S_2$ to the target point are expressed by $l_1$ and $l_2$, respectively. Further, a distance between the points $S_1$ and $S_2$ is $l_{12}$. Now, it is supposed that the target point is on a perpendicular line passing through the mid point of the $S_1$ and $S_2$, and that $l_1 = l_2$. With a proportion of each measurement error being β, the right/left error of the position of the object becomes the largest when, as shown in FIG. 12, the target point is at distances of $l_1(1-\beta)$ from $S_1$ and $l_2(1+\beta)$ from $S_2$. The right/left error x in this case can be calculated from the theorem of three squares as the equation 5.

$$\{l_1(1-\beta)\}^2 - (l_{12}/2-x)^2 = \{l_2(1+\beta)\}^2 - (l_{12}/2+x)^2 \qquad \text{Equation 5}$$

Next, expanding and organizing both sides of the equation 5 for x provide the equation 6. Further, now $l_1=l_2$, so that combining and organizing the right side by $l_2$ provide the equation 7.

$$x = \{l_2^2(1+\beta)^2 - l_1^2(1-\beta)^2\}/(2l_{12}) \qquad \text{Equation 6}$$

$$x = 2\beta l_2^2/l_{12} \qquad \text{Equation 7}$$

As a result, now, it is supposed that the robot exists at 1 m in front of the observer, the points $S_1$ and $S_2$ exist on the right and left of the HMD 2, and $l_{12}$=0.2 m. Then, when measurement is done with no error, $l_1$ and $l_2$ are 1.005 m according to the theorem of three squares. Now, it is supposed that the measurement error β of $l_1$ and $l_2$ by the sensors is 0.01, the displacement x in the right/left directions is 2×0.01×(1.005)²/0.2=0.101.

Therefore, when the thickness of the nimbus 42 is 10 cm, the protrusion due to the measurement error can be covered. Further, this error is proportional to the square of a distance, and when the robot is at a half distance, the thickness of the nimbus may be 2.5 cm, which is ¼.

The sum of the above-described thickness of the nimbus 42 which compensates the measurement error in the depth direction and the above-described thickness of the nimbus 42 which compensates the measurement error in the up/down directions and right/left directions is the necessary thickness of the nimbus 42.

Next, in a case that the processing of the computer graphics 40 becomes late for the operation of the humanoid robot 1, a method of calculating a thickness t of the nimbus 42 necessary for compensating the delay will be described.

Figure 13:
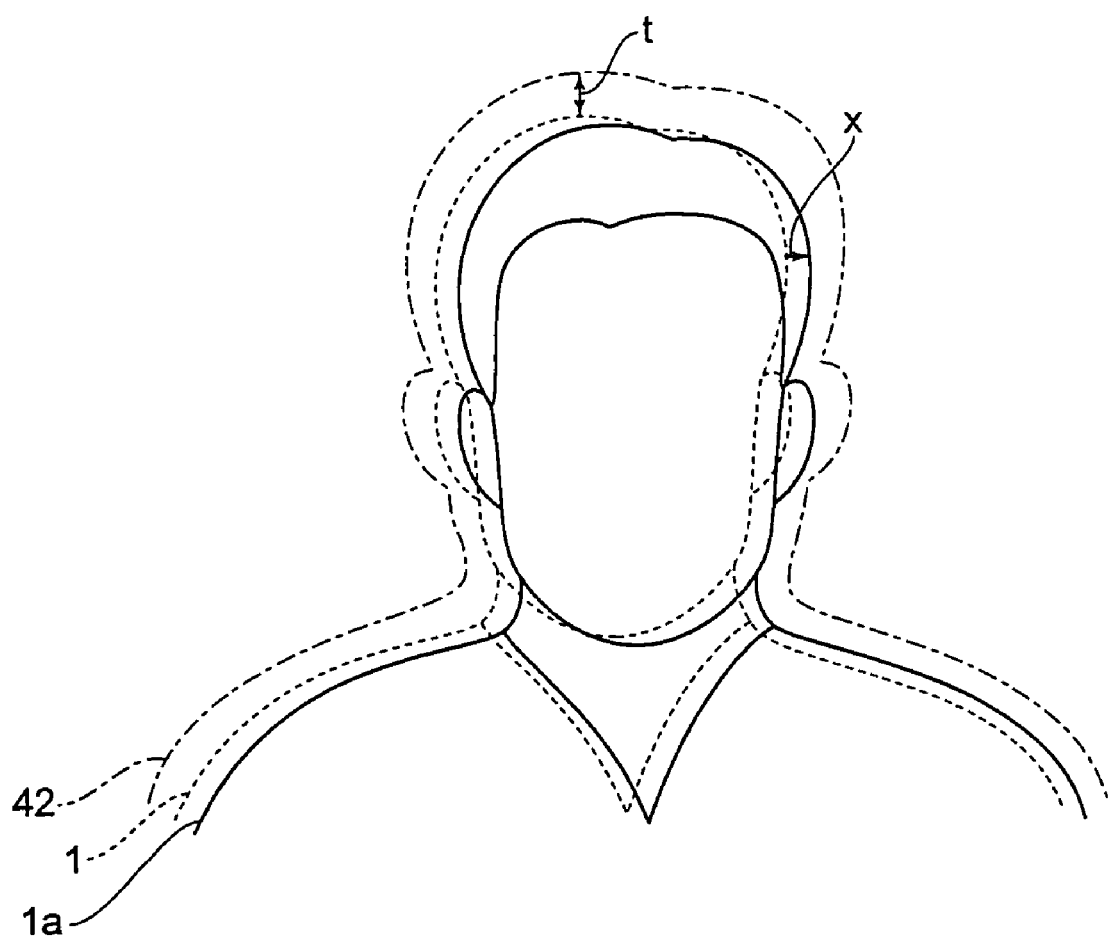
FIG. 13 is a view showing a thickness of a nimbus which compensates a delay of image processing when a humanoid robot moves to a next state during a time T (the humanoid robot after the time T)

Now, a time (=delay) from a moment that the humanoid robot 1 moves until the computer graphics 40 are displayed on the HMD 2 based on the humanoid robot 1 that is moved is T (sec). Further, an operation speed of the humanoid robot 1 is V (m/sec). Then, as shown in FIG. 13, a distance X (m) of movement of the humanoid robot 1 to the next state (the humanoid robot after the time T) 1*a* becomes VT (m).

Therefore, when the thickness t (m) of the nimbus is set to VT (m), even if the display processing of the computer graphics 40 cannot catch up with the operation of the humanoid robot 1, there is no chance that the humanoid robot 1*a* after the time T is seen outside the thickness t of the nimbus 42.

For example, the delay T of processing the computer graphics 40 is 0.1 sec, and the operation speed V of a hand, which is the fastest speed among the speeds of a robot which do not make a human anxious, is 0.6 m/sec. Then, the thickness t of the nimbus which compensates the delay is 6 cm, which is the distance X (=TV) of the humanoid robot which moved at 0.1 sec.

(Second Embodiment)

In the first embodiment, the data of human computer graphics is stored in the storage unit 16 through a medium, but in this embodiment, the data of human computer graphics distributed from a download device 3 is received through a network such as the Internet, and the received data of human computer graphics is stored in the storage unit 16.

Figure 14:
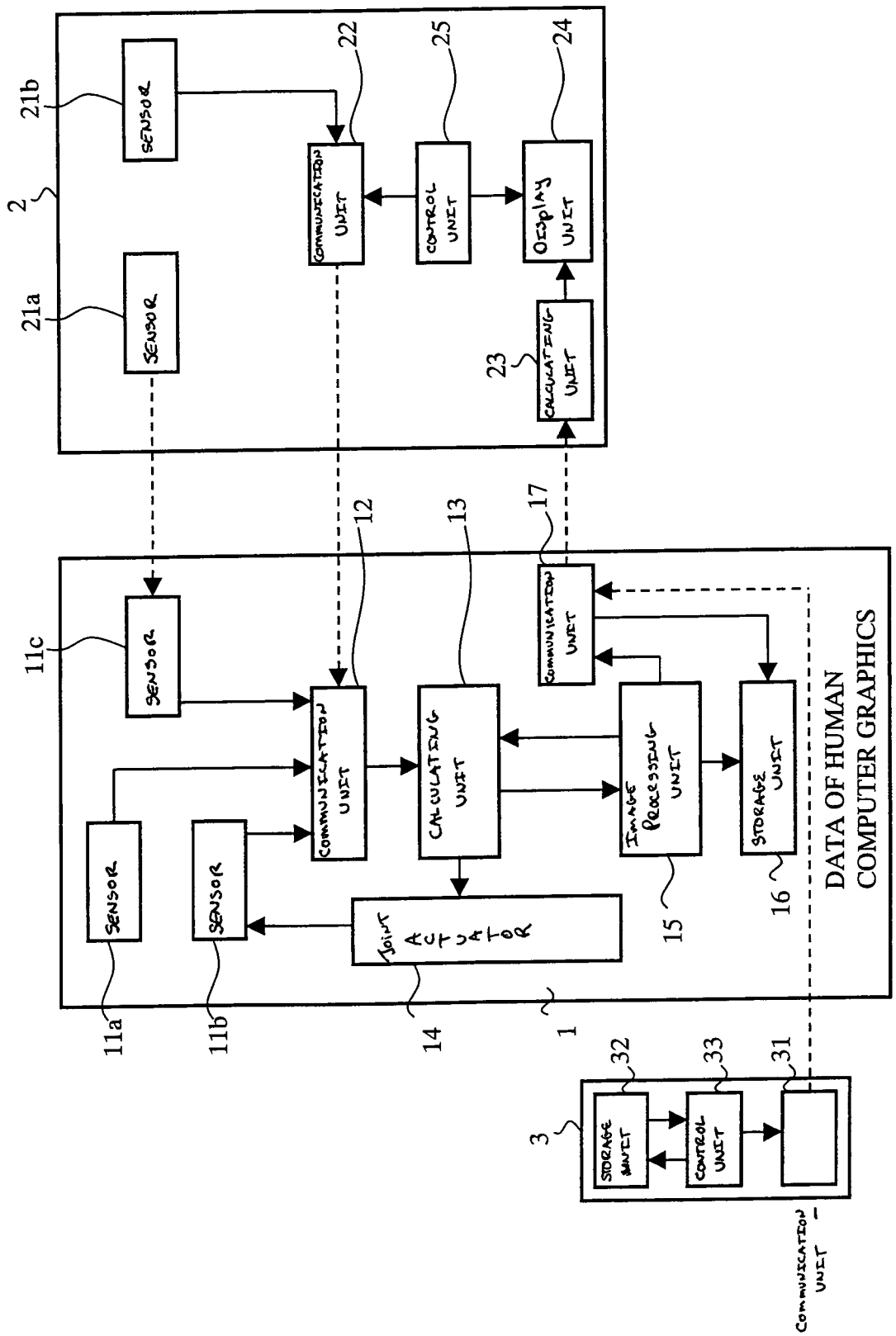
FIG. 14 is a block diagram showing a second embodiment of an image processing system of the present invention.

FIG. 14 is a block diagram showing the configuration of an image processing system of this invention. In FIG. 14, the download device 3 is a server which provides a homepage on a network (not-shown) such as the Internet, and distributes (downloads) via the network to a user of an image processing device who accesses the homepage the data of computer graphics 40 which is desired by the user.

Inside this download device 3, as shown in FIG. 14, there are provided a communication unit 31 that is one aspect of a communication device, a storage unit 32, and a control unit 33. The communication unit 31 is a component which performs data communication via a not-shown network. The storage unit 32 is a component which stores the data of computer graphics 40 which strongly resemble, for example, plural celebrities. The control unit 33 is a component which controls operation of respective units of the download device 3, distributes the data of the computer graphics 40 and manages the distribution history.

The communication unit 17 of the humanoid robot 1 is connectable to a network. Therefore, the user can access a homepage provided on the network via the communication unit 17 of the humanoid robot 1.

Incidentally, the other configuration is the same as the configuration shown in FIG. 1, so that the same reference numerals are designated to the same components, thereby omitting overlapping descriptions.

Next, operation of the image processing system of the present invention will be described based on FIG. 15.

Figure 15:
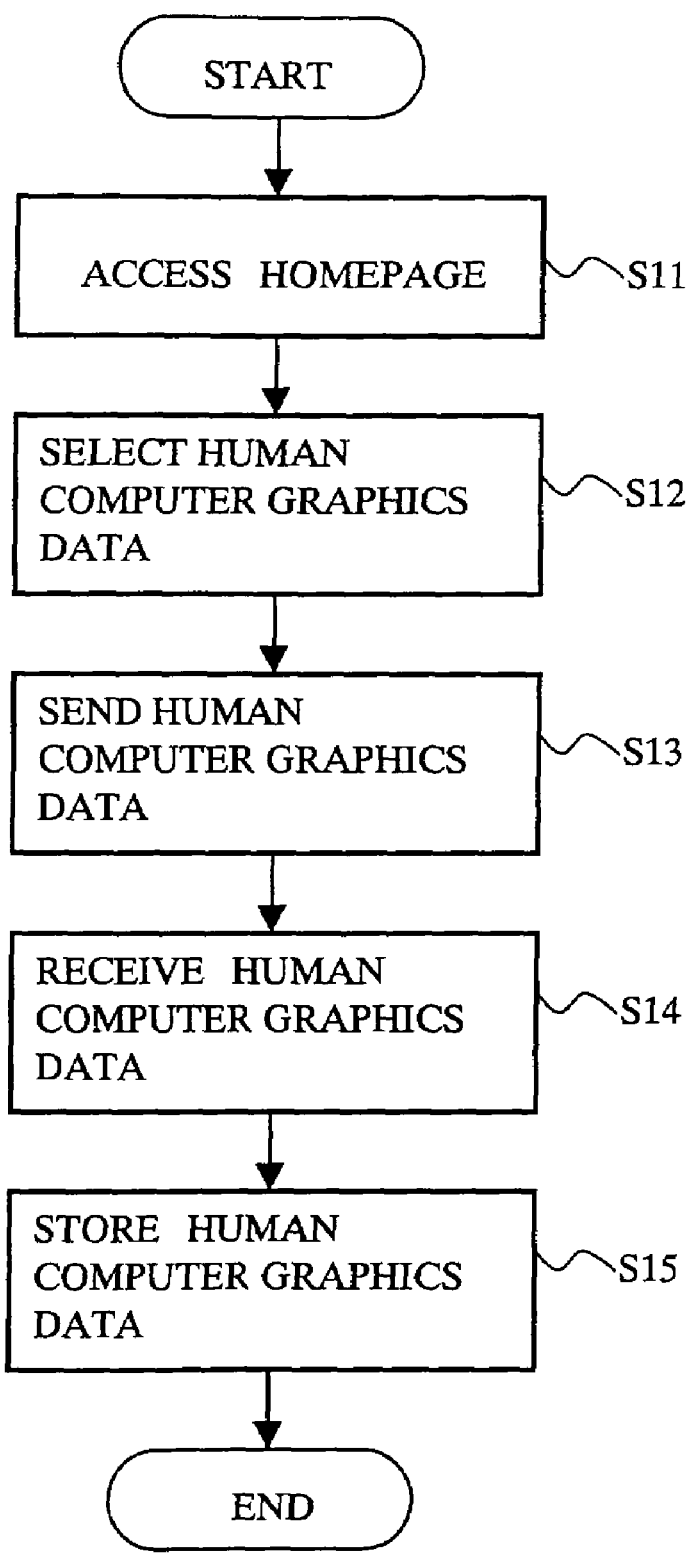
FIG. 15 is a flowchart for describing processing operation of downloading computer graphics from a download device and storing the computer graphics in the image processing system of FIG. 14.

FIG. 15 is a flowchart describing a flow of operation of the image processing system of the present invention. When the user of the image processing device desires distribution of the data of the computer graphics 40, the user first accesses a homepage provided on a network by the download device 3 (Step S11). Next, the user selects the data of desired human computer graphics by clicking an icon or the like on the homepage, (Step S12).

When the data of human computer graphics is selected by the user accessing the homepage, the control unit 33 of the download device 3 distributes the selected data of human computer graphics from the communication unit 31 to the humanoid robot 1 via the network (Step S13).

In the humanoid robot 1, when the communication unit 17 receives the data of human computer graphics distributed from the download device 3 (Step S14), the received data of human computer graphics is stored and saved in the storage unit 16 (Step S15).

As described above, according to this embodiment, since the download device 3 is configured to distribute the data of human computer graphics via a network, the user can simply and surely obtain various data of human computer graphics. As a result, the usability of the image processing device can be further improved.

(Third Embodiment)

Next, an image processing system that is configured to perform image processing in an HMD 2 will be described.

Figure 16:
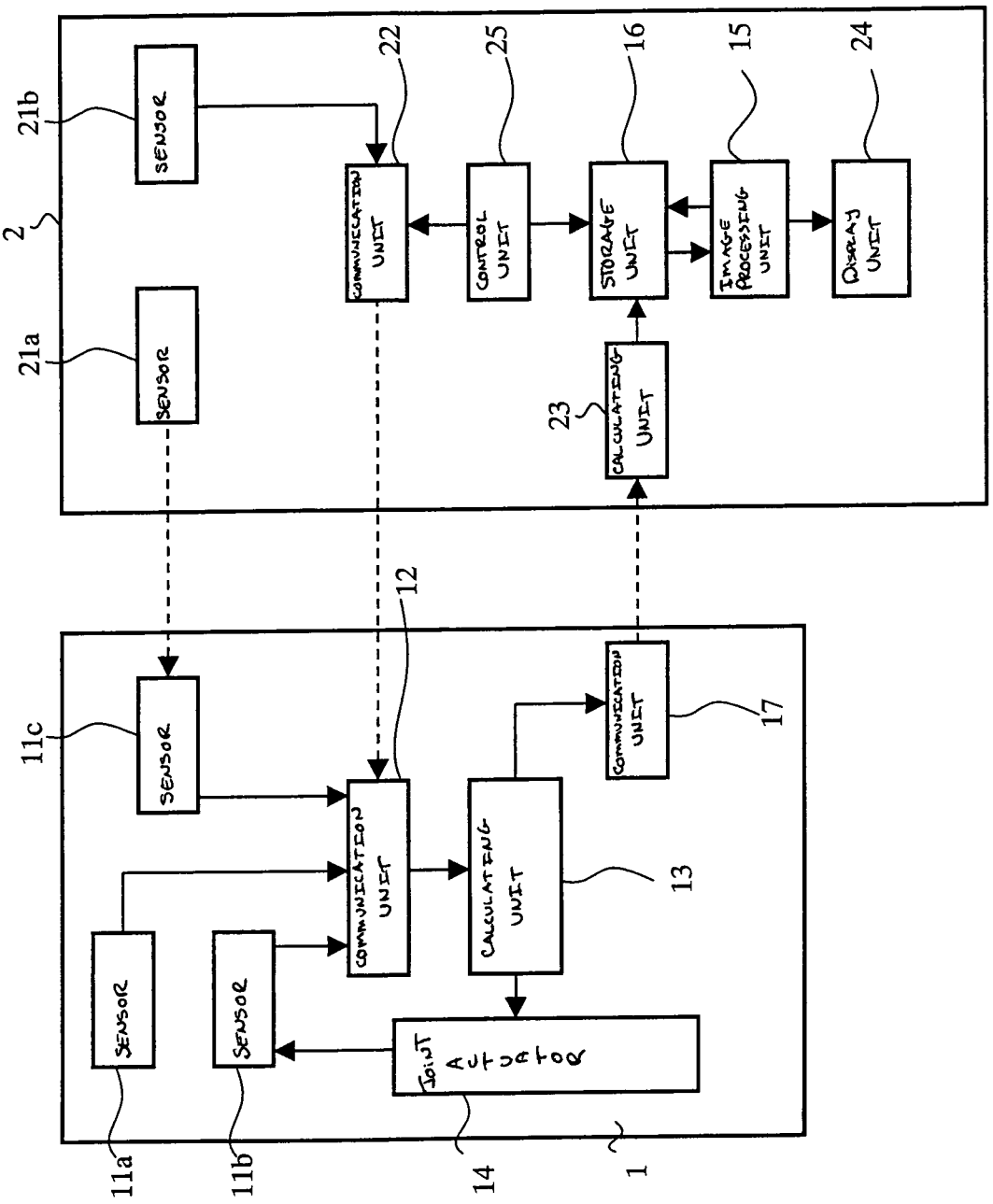
FIG. 16 is a block diagram showing a third embodiment of an image processing system of the present invention.

As shown in FIG. 16, a humanoid robot 1 has sensors 11*a*, 11*b* and 11*c*, a communication unit 12, a relative position posture calculating unit 13, a joint actuator 14, and a communication unit 17. Further, the HMD 2 has an image processing unit 15, a storage unit 16, sensors 21*a* and 21*b*, communication units 22 and 23, a three-dimensional image displaying unit 24, and a control unit 25. Functions of both components of the humanoid robot 1 and the HMD 2 are the same as the functions described in the first embodiment.

The humanoid robot 1 calculates a positional relationship between the posture of the humanoid robot 1 and an observer based on data from the respective sensors 11*a*, 11*b*, 11*c* and 21*b*, and sends a calculation result thereof to the HMD 2. The HMD 2 selects computer graphics 40 from the storage unit 16 based on the calculation result sent from the humanoid robot 1, and displays the selected computer graphics 40 on the three-dimensional image displaying unit 24.

Thus, by providing the function of image processing in the HMD 2, the cost of the humanoid robot 1 can be reduced, and original functions of the robot can be enhanced.

(Fourth Embodiment)

Next, an image processing system in a case that a humanoid robot 1 is holding a chocolate as an example of a second actual object and the humanoid robot 1 is observed through computer graphics will be described. A fourth embodiment of the image processing system has the same devices as each of the humanoid robot 1 and the HMD 2 described in the first embodiment or the third embodiment, or the same devices as each of the humanoid robot 1, the HMD 2, and the download device 3 described in the second embodiment. Here, an example that the image processing system has the humanoid robot 1 and the HMD 2 described in the first embodiment or in the third embodiment will be described.

One of the differences between the fourth embodiment and the preceding embodiments is that the fourth embodiment has a lacking area represented by a hole or a dented portion so that an observer can observe the second actual object through the computer graphics superimposed on the humanoid robot 1. Further, another difference between the fourth embodiment and the preceding embodiments is that a nimbus is also generated around the periphery of the above-described lacking area of the above-described computer graphics.

Figure 17:
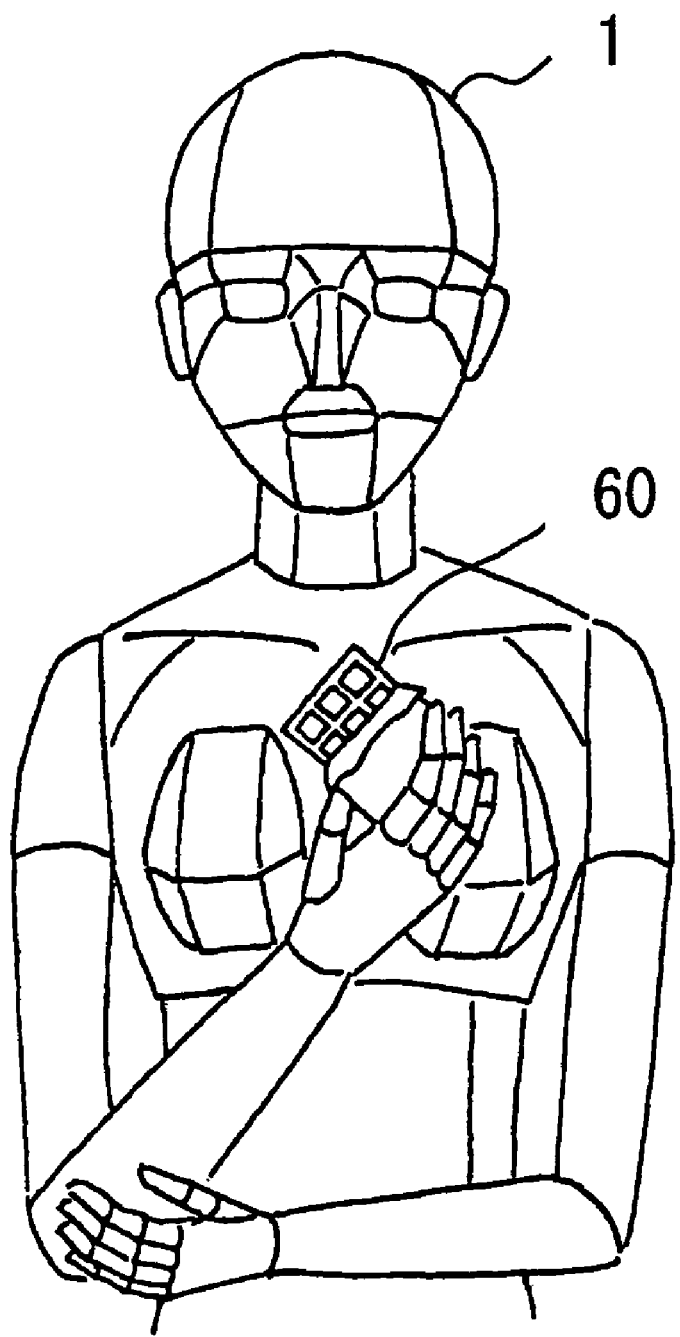
FIG. 17 is a view showing a state that a humanoid robot is holding a chocolate.
Figure 18:
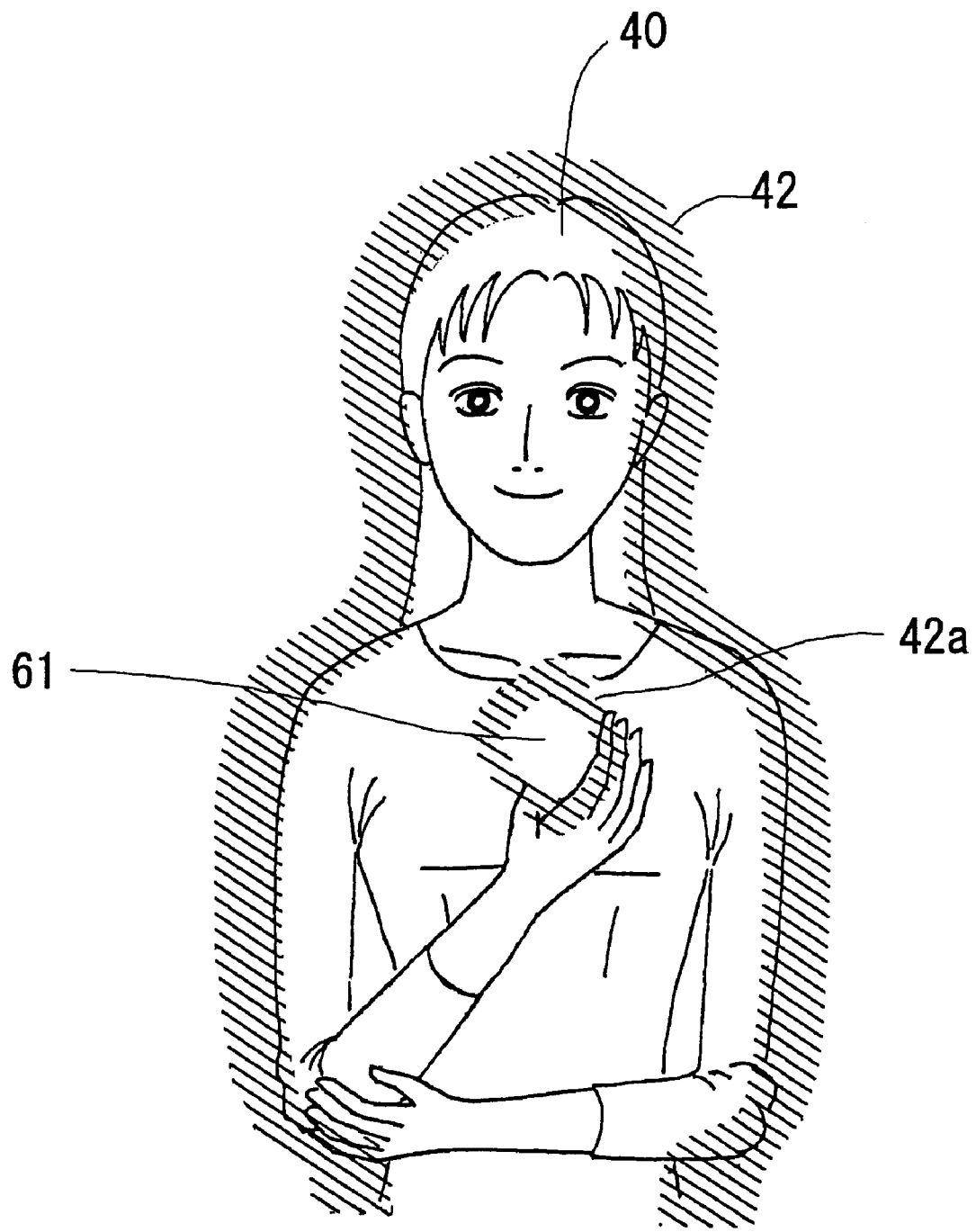
FIG. 18 is a view showing computer graphics arranged between the humanoid robot shown in FIG. 17 and an observer.
Figure 19:
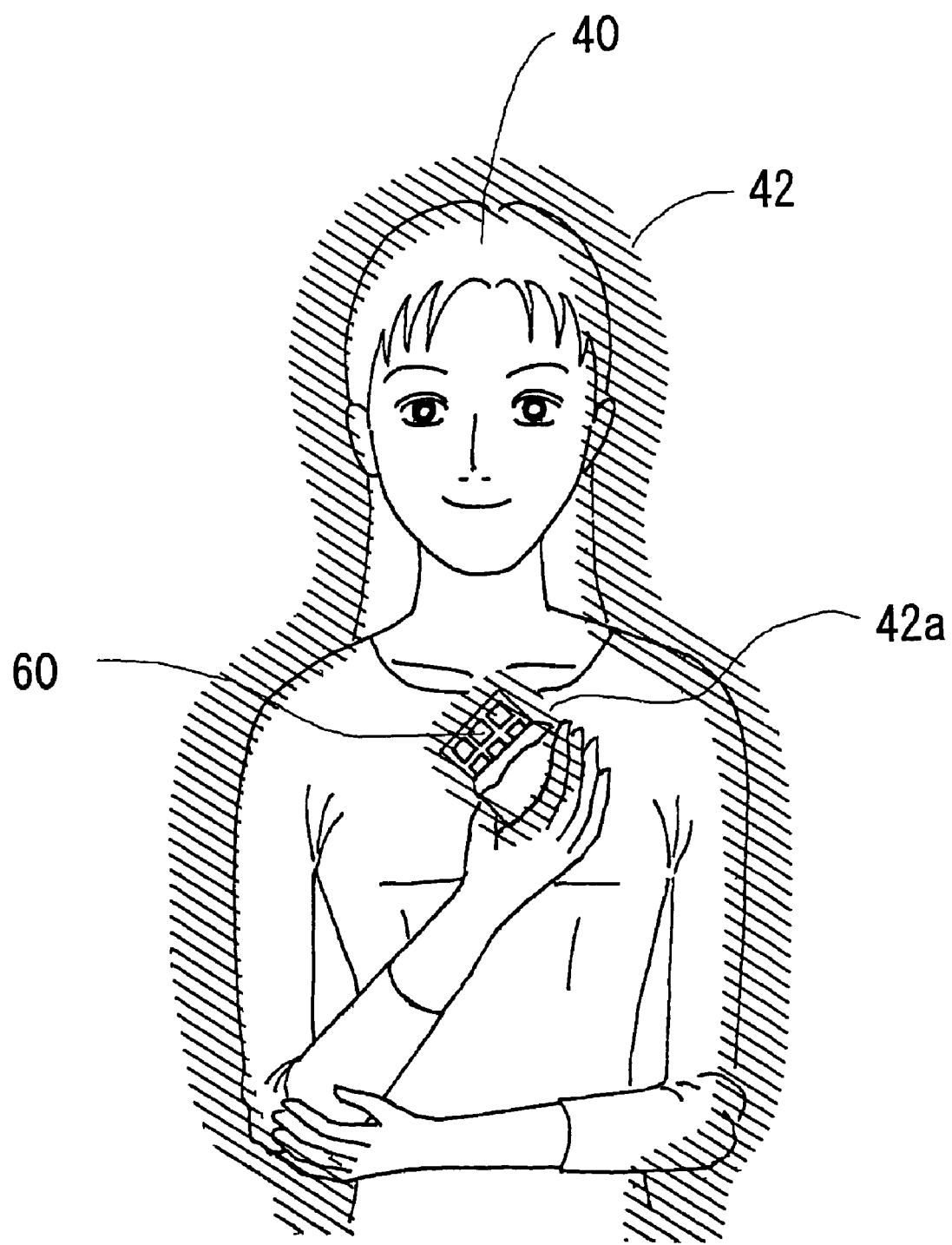
FIG. 19 is a view showing a sight of observing the humanoid robot shown in FIG. 17 through the computer graphics shown in FIG. 18.

FIG. 17 is a view showing a state that the humanoid robot 1 is holding a chocolate 60. Further, FIG. 18 is a view showing computer graphics 40 arranged between the humanoid robot 1 shown in FIG. 17 and the observer. The computer graphics 40 has the nimbus 42 similar to that in the embodiments which are already described and also a nimbus 42*a* around a lacking area (here, a hole) 61 provided corresponding to the location of the chocolate 60. Therefore, when the observer views the humanoid robot 1 through the computer graphics 40 projected on the HMD 2, the observer can recognize, as shown in FIG. 19, the computer graphics 40 with the hole 61 formed on a part thereof, through which the chocolate 60 can be seen.

When the humanoid robot 1 performs an action of eating the chocolate 60, data of the distance between the humanoid robot 1 and the HMD 2, the position of the hand holding the chocolate 60, and so on are sent from the humanoid robot 1 to the HMD 2. Based on the data, the HMD 2 selects the computer graphics 40 on which the hole 61 for the chocolate is formed around the mouth, and projects them. Corresponding to actions of the humanoid robot 1, the computer graphics 40 matching the respective actions are selected and then projected. Thus, the observer can see a moving image in which the computer graphics 40 of an idol, not the humanoid robot 1, eating the chocolate 60. The nimbus 42 and the nimbus 42*a* are provided around the periphery of the computer graphics 40 and the periphery of the hole 61, respectively, so that the humanoid robot 1 is not accidentally seen by the observer due to the displacement of the humanoid robot 1 and the chocolate 60 from the computer graphics 40.

Further, by providing in this image processing system the download device 3 described in the second embodiment, the following processing can be performed. A barcode is assigned to the humanoid robot 1, and when the barcode is read by a barcode reader connected to a personal computer, data of the barcode is sent to the download device 3 that is connected to the personal computer via a communication line such as the Internet. The download device 3 selects the computer graphics 40 based on the barcode and sends them to the HMD 2. The observer wearing the HMD 2 observes the humanoid robot 1 via the computer graphics 40, so that the observer can recognize the computer graphics 40 in an idol figure holding the chocolate 60.

Further, from the first embodiment to the fourth embodiment, described are the image processing device and the image processing system in which the data of human computer graphics are applied, but they are not limited as such. For example, they may be computer graphics of an animal (such as a dog) other than the human. In this case, an animal-type robot (such as a dog-type robot) may be used instead of the humanoid robot 1.

Further, the second embodiment is configured such that the human computer graphics data distributed from the download device 3 are received by the humanoid robot 1, but it may be configured such that the relative position postured calculating unit 13 and the image processing unit 15 are provided on the HMD 2 side, and the human computer graphics data is received by the HMD 2 side.

Further, the user may be allowed to access by his/her personal computer a homepage of the download device 3, download the data of human computer graphics by the personal computer, transfer the downloaded data of human computer graphics to a medium, and store the data in the storage unit 16 of the HMD 2 via the medium.

Incidentally, instead of the image generating device or in addition to the image generating device, an image selecting device may be adopted. Specifically, instead of generating the computer graphics, various computer graphics are prepared in a memory in advance based on data such as a distance between the humanoid robot 1 and the HMD 2, and appropriate computer graphics may be selected inside the memory based on the above-described data.

Further, instead of the nimbus generating device or in addition to the nimbus generating device, a device which selects a nimbus may be adopted. Thus, the image processing system, the image processing device or the display device of the present invention only need to perform processing of simply selecting an appropriate nimbus based on the above-described data without generating the nimbus each time.

Further, the nimbus may be an opaque layer or a translucent layer through which the back thereof is seen slightly.

INDUSTRIAL AVAILABILITY

The present invention can be utilized for production and distribution of a commercial in which a robot and computer graphics are combined.

The invention claimed is:

1. An image processing system, comprising:
an image selecting device for selecting computer graphics in a figure corresponding to a figure of an actual object and a positional relationship between an observer, who is viewing the actual object, and the actual object;
a nimbus generating device for generating a nimbus image around a periphery of the computer graphics;
a combined image generating device for generating a combined image combining the computer graphics and the nimbus image; and
an image display processing device for displaying the combined image on a display which is viewed by the observer so that the combined image is superimposed on the actual object;
the computer graphics having a lacking area for showing the observer a second actual object having a part which exists on the observer side than the actual object, and said nimbus generating device generating a nimbus image around a periphery of the lacking area.

2. An image processing system, comprising:
an image processing device having an image selecting device for selecting computer graphics in a figure corresponding to a figure of an actual object and a positional relationship between an observer, who is viewing the actual object, and the actual object; a nimbus generating device for generating a nimbus image around a periphery of the computer graphics; a combined image generating device for generating a combined image combining the computer graphics and the nimbus image; and a combined image sending device for sending the combined image to the observer side; and a display device having an image display processing device for displaying the combined image, which is sent from said combined image sending device, on a display which is viewed by the observer so that the combined image is superimposed on the actual object;

the computer graphics having a lacking area for showing the observer a second actual object having a part which exists on the observer side than the actual object, and said nimbus generating device generating a nimbus image around a periphery of the lacking area.

3. An image processing system, comprising:

an image generating device for generating computer graphics in a figure corresponding to a figure of an actual object and a positional relationship between an observer, who is viewing the actual object, and the actual object;

a nimbus generating device for generating a nimbus image around a periphery of the computer graphics;

a combined image generating device for generating a combined image combining the computer graphics and the nimbus image; and an image display processing device for displaying the combined image on a display which is viewed by the observer so that the combined image is superimposed on the actual object:

the computer graphics having a lacking area for showing the observer a second actual object having a part which exists on the observer side than the actual object, and said nimbus generating device generating a nimbus image around a periphery of the lacking area.

4. An image processing system, comprising:

an image processing device having an image generating device for generating computer graphics in a figure corresponding to a figure of an actual object and a positional relationship between an observer, who is viewing the actual object, and the actual object; a nimbus generating device for generating a nimbus image around a periphery of the computer graphics; a combined image generating device for generating a combined image combining the computer graphics and the nimbus image; and a combined image sending device for sending the combined image to the observer side; and a display device having an image display processing device for displaying the combined image, which is sent from said combined image sending device, on a display which is viewed by the observer so that the combined image is superimposed on the actual object;

the computer graphics having a lacking area for showing the observer a second actual object having a part which exists on the observer side than the actual object, and said nimbus generating device generating a nimbus image around a periphery of the lacking area.

5. The image processing system according to any one of claim 1 to claim 4, wherein said nimbus generating device estimates an error in measurement of a distance between the observer and the actual object, and generates based on the error the nimbus image having an adequate thickness for preventing the actual object from being seen protruding from a periphery of the computer graphics.

6. The image processing system according to any one of claim 1 to claim 4, wherein said nimbus generating device generates the nimbus image having an adequate thickness for not showing the observer a displacement which occurs between the actual object and the computer graphics when the actual object or the observer moves.

7. The image processing system according to any one of claim 1 to claim 4, further comprising a detecting device for detecting at least one of a distance and an angle between a display which is viewed by the observer and the actual object and a direction of the actual object seen from the observer.

8. The image processing system according to any one of claim 1 to claim 4, wherein the actual object is a humanoid robot or an animal-type robot other than a human, which can freely move.

9. The image processing system according to any one of claim 1 to claim 4, further comprising a communication device for receiving the computer graphics from outside via a network.

10. An image processing device, comprising:

an image selecting device for selecting computer graphics in a figure corresponding to a figure of an actual object and a positional relationship between an observer, who is viewing the actual object, and the actual object;

a nimbus generating device for generating a nimbus image around a periphery of the computer graphics; and a combined image generating device for generating a combined image combining the computer graphics and the nimbus image;

the computer graphics having a lacking area for showing the observer a second actual object having a part which exists on the observer side than the actual object, and said nimbus generating device generating a nimbus image around a periphery of the lacking area.

11. An image processing device, comprising:

an image generating device for generating computer graphics in a figure corresponding to a figure of an actual object and a positional relationship between an observer, who is viewing the actual object, and the actual object;

a nimbus generating device for generating a nimbus image around a periphery of the computer graphics; and a combined image generating device for generating a combined image combining the computer graphics and the nimbus image;

the computer graphics having a lacking area for showing the observer a second actual object having a part which exists on the observer side than the actual object, and said nimbus generating device generating a nimbus image around a periphery of the lacking area.

12. The image processing device according to claim 10 or claim 11, wherein said nimbus generating device estimates an error in measurement of a distance between the observer and the actual object, and generates based on the error the nimbus image having an adequate thickness for preventing the actual object from being seen protruding from a periphery of the computer graphics.

13. The image processing device according to claim 10 or claim 11, wherein said nimbus generating device generates the nimbus image having an adequate thickness for not showing the observer a displacement which occurs between the actual object and the computer graphics when the actual object or the observer moves.

14. The image processing device according to claim 10 or claim 11, further comprising a detecting device for detecting at least one of a distance and an angle between a display which is viewed by the observer and the actual object and a direction of the actual object seen from the observer.

15. The image processing device according to claim 10 or claim 11, further comprising a communication device for receiving the computer graphics from outside via a network.

16. An image processing device, comprising:
means for selecting computer graphics in a figure corresponding to a figure of an actual object and a positional relationship between an observer, who is viewing the actual object, and the actual object;
means for generating a nimbus image around a periphery of the computer graphics; and
means for combining the computer graphics and the nimbus image;
the computer graphics having a lacking area for showing the observer a second actual object having a part which exists on the observer side than the actual object, and said means for generating a nimbus image generating nimbus image around a periphery of the lacking area.

17. An image processing device, comprising:
means for generating computer graphics in a figure corresponding to a figure of an actual object and a positional relationship between an observer, who is viewing the actual object, and the actual object;
means for generating a nimbus image around a periphery of the computer graphics; and
means for combining the computer graphics and the nimbus image;
the computer graphics having a lacking area for showing the observer a second actual object having a part which exists on the observer side than the actual object, and said means for generating a nimbus image generating a nimbus image around a periphery of the lacking area.

18. The image processing device according to claim 16 or claim 17, wherein said means for generating a nimbus image estimates an error in measurement of a distance between the observer and the actual object, and generates based on the error the nimbus image having an adequate thickness for preventing the actual object from being seen protruding from a periphery of the computer graphics.

19. The image processing device according to claim 16 or claim 17, wherein said means for generating a nimbus image generates the nimbus image having an adequate thickness for not showing the observer a displacement which occurs between the actual object and the computer graphics when the actual object or the observer moves.

20. The image processing device according to claim 16 or claim 17, further comprising means for detecting at least one of a distance and an angle between a display which is viewed by the observer and the actual object and a direction of the actual object seen from the observer.

21. The image processing device according to claim 16 or claim 17, further comprising means for receiving the computer graphics from outside via a network.

22. A display device, comprising an image display processing device for displaying a combined image, which is generated by combining a nimbus image generated around a periphery of computer graphics in a figure corresponding to a figure of an actual object and a positional relationship between an observer, who is viewing the actual object, and the actual object, on a display which is viewed by the observer so that the combined image is superimposed on the actual object, the computer graphics having a lacking area for showing the observer a second actual object having a part which exists on the observer side than the actual object, and the nimbus image also existing around the lacking area.

* * * * *